June 2, 1970 GIICHI OGAWA 3,515,324

TAPE CUTTER FOR CUTTING AN ADHESIVE TAPE IN A DEFINITE LENGTH SUCCESSIVELY

Filed Aug. 14, 1968 2 Sheets-Sheet 1

INVENTOR

GIICHI OGAWA

BY

Browne, Schuyler & Beveridge

ATTORNEYS

June 2, 1970 GIICHI OGAWA 3,515,324

TAPE CUTTER FOR CUTTING AN ADHESIVE TAPE IN A DEFINITE LENGTH SUCCESSIVELY

Filed Aug. 14, 1968 2 Sheets-Sheet 2

INVENTOR

GIICHI OGAWA

BY Browne, Schuyler & Beveridge

ATTORNEYS

United States Patent Office 3,515,324
Patented June 2, 1970

3,515,324

TAPE CUTTER FOR CUTTING AN ADHESIVE TAPE IN A DEFINITE LENGTH SUCCESSIVELY

Giichi Ogawa, 49, Kunitachi, Kunitachi-shi, Tokyo, Japan

Filed Aug. 14, 1968, Ser. No. 752,676
Claims priority, application Japan, Oct. 31, 1967, 42/55,981
Int. Cl. B26f 3/02
U.S. Cl. 225—11 3 Claims

ABSTRACT OF THE DISCLOSURE

A tape cutter having a tape drum from which an adhesive tape is pulled out, a feed drum to be rotated by adhering of an advancing adhesive tape to the upper surface thereof, a regulating disc which is provided with several series of regulating holes in several concentric circles at equal intervals in the respective series and connected with the feed drum elastically, an action shaft whereon a sleeve with a pawl usually pressing on the face of the regulating disc is turnably mounted so as to turn therewith and to slide thereon, and a sliding plate whereto a cutting edge and a blunt edge are fixed at the upper end thereof. When an adhesive tape is pulled out from the tape drum, the tape is fed by rotation of the feed drum and cut in the length corresponding to the interval of the selected series of the regulating holes by depression of the cutting edge with the tape while the feed drum is prevented from rotating by engagement of the pawl with a regulating hole. A fall of the sliding plate accompanying with the depression of the cutting edge disengages the pawl from the regulating hole through a lever and the action shaft urged by a spring and returns the pawl to the usual position relative to the regulating holes.

This invention relates to a tape cutter capable of cutting an adhesive tape in a definite length successively or, if required, in any desired length and more particularly to a tape cutter capable of cutting an adhesive tape successively in a definite length merely by pulling out the adhesive tape from a tape drum passing a feed drum with a regulating disc and depressing a cutting edge with the tape.

An object of this invention is to provide a simple and economical tape cutter capable of cutting an adhesive tape in a definite length successively and efficiently.

Another object of this invention is to provide a tape cutter capable of cutting an adhesive tape in a definite length or any desired length by a single manual operation.

A further object of this invention is to provide a tape cutter capable of cutting an adhesive tape in accurate lengths by regulation of feeding the tape.

A still further object of this invention is to provide a tape cutter capable of cutting an adhesive tape easily without resistance against pulling of the tape for cutting.

The exact nature of the invention as well as other objects and advantages thereof will become apparent from consideration of the detailed specification referring to the accompanying drawings, in which.

Similar reference characters designate corresponding parts throughout the several figures of the drawings.

Figure 7:
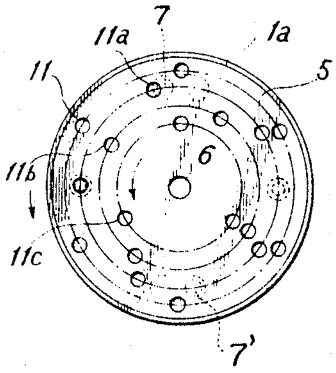
FIG. 7 is an elevational view of a regulating disc with a feed drum.
Figure 8:
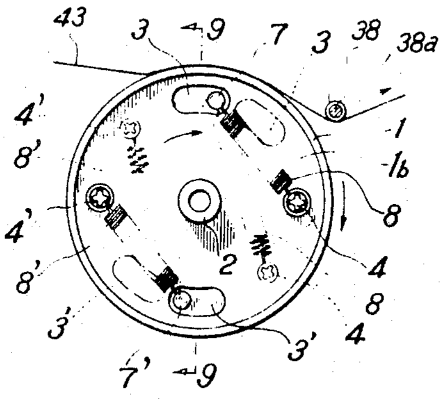
FIG. 8 is an elevational view from the back side of the same.
Figure 9:
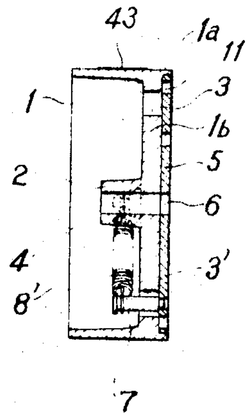
FIG. 9 is a vertical sectional view taken on the line 9—9 of FIG. 8.

Referring now to the drawings embodying the invention, and more particularly to FIGS. 7–9 inclusive, the reference character 1 designates a feed drum having a bottom-like web plate **1*b* from which a hub is projected inwardly at the center thereof. The web plate 1*b* is provided with two-arc-shaped slots 3 and 3′ apart from each other at the angle of 180 degree in a concentric circle and two studs 4 and 4′ projecting inward respectively in the middle between the two slots 3 and 3′. The inner face of a regulating disc 5, to which two pins 7 and 7′ are fixed apart from each other at the angle of 180 degrees corresponding to the slots 3 and 3′, is put upon the outer face of the web plate 1*b*, being fitted in a protruding rim 1*a*, so that the two pins 7 and 7′ may be projected through the slots 3 and 3′ and connected with the two studs 4 and 4′ by means of tension coiled springs 8 and 8′ respectively. The regulating disc 5 is provided with many regulating holes 11, 11*a*, 11*b* and 11*c* in several series in several concentric circles around the central aperture 6**, where the regulating holes in every series is arranged at equal intervals.

Referring to FIGS. 1–6 inclusive, a left side plate 9, which is fixed uprightly to the base plate 40 at the horizontal lower portion **9*a*, forms a frame together with a right side plate 36 which has an arc-shaped cover 42 projected inward therefrom and is connected with the left side plate 9 spaciously parallel to the right side plate 36 by means of a hinge 37. The feed drum is mounted rotatably together with the regulating disc 5 on a lateral horizontal shaft 10 overhung from the inside of the left side plate 9 in the middle part of the frame. The left side plate 9 is provided with a comb-shaped aperture 13 having several pectinate slots 12, 12*a*, 12*b*, 12*c* and 12*d* upwardly on a level with the shaft 10. The pectinate slots 12, 12*a*, 12*b* and 12*c* correspond to the series of the regulating holes 11, 11*a*, 11*b* and 11*c* respectively, where a pectinate slot 12*d*** at the right end corresponds to no series of the regulating holes and is used for cutting an adhesive tape in any desired length.

Figure 11:
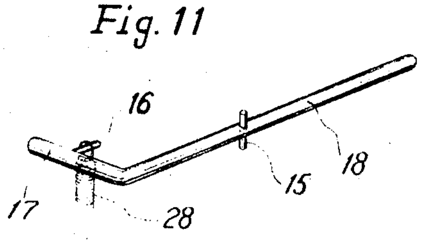
FIG. 11 is a perspective view of an action shaft.
Figure 10:
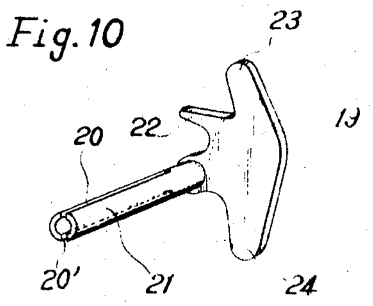
FIG. 10 is a perspective view of a sleeve with a collar.

As shown in FIG. 10, a collar 19, which has a pawl 22 to be engaged with the regulating hole, a projection 23 for limiting the depth of engagement and another projection 24 for contacting with the outer surface of the left side plate 9, is fixed to the rear end of a sleeve 21 having two opposing axial slits 20 and 20′ cut in from the front end thereof. As shown in FIG. 11, an action shaft 18 bent to form an arm 17 at the front end has a pin 15 piercing through the main portion perpendicularly thereto at the middle and another pin 16 secured to the arm 17, and passes through the sleeve 21, fitting the pin 15 loosely in the slits 20 and 20′ so that the action shaft 18 may turn together with the sleeve 21 which is capable of sliding axially on the action shaft 18.

The main portion of the action shaft 18 with the sleeve 21 thereon is turnably journaled, facing to the aperture 13, in two bearings **14*a* and 14*b* provided on the outer surface of the left side plate 9 holding the aperture 13 between those bearings 14*a* and 14*b*** of which the front one 14*b* has an inside opening covered by a flat plate 14*c* whose vertical slot guides the turning of the arm 17.

A sliding plate 32 is put upon the inner surface of the front end plate 29, which is fixed to the left side plate 9 uprightly and closes an opening of the front end of the frame, and two vertical slots 29*a* and 29'*a* provided on the front end plate 29 receive respectively two guide pins 33 and 33' projected horizontally from the sliding plate 32 so that the sliding plate 32 with side guide pieces 31 and 31' on both sides of the upper end thereof may slide up and down on the front end plate 29. A cutter blade 30 of V-shaped cross section with a serrated cutting edge 30*a* preceded by a blunt edge 30*b* for contact with an adhesive tape is fixed to the upper end of the sliding plate 32. The lower end of the sliding plate 32 curves for contact with the front side 27*b* of a rockable lever 27 pivoted on a lateral horizontal shaft 26 overhung from an upright supporting plate 25 fixed longitudinally to the bottom portion of the left side plate 9. The pin 16 secured to the arm 17 of the action shaft 18 is connected with a hook 25*a* projected from the lower portion of the supporting plate 25 by a tension coiled spring 28, so that the arm 17 of the action shaft 18 may be pulled downward to depress the rear end 27*a* of the lever 27 with the consequent result that the front end 27*b* of the lever 27 raises the sliding plate 32 up to the usual position in which the pawl 22 is pressed on the outer face of the regulating disc 5 between the regulating holes by turning of the action shaft 18 together with the collar 19 inward.

A tape drum 34 on which an adhesive tape 43 wound is rotatably mounted on a lateral horizontal shaft 35 overhung from the inside of the upper rear portion of the left side plate 9.

The adhesive tape 43, when pulled out from the tape drum 34 and advanced keeping the adhesive face down, causes the feed drum 1 to rotate clockwise, as shown in FIG. 8, by adhering to the upper surface thereof so as to be fed by such length as corresponds to the position relative to the pectinate slots of the collar 19 or pawl 22.

A guide roll 38 to guide the non-adhesive face of the advancing adhesive tape is mounted rotatably on a lateral horizontal shaft 38*a* overhung from the inside of the right side plate 36 in front of the feed drum 1.

Therefore, the adhesive tape 43 fed by the feed drum 1 advances passing the guide roll 38 and reaches the cutting edge 30*a* to be cut in the length corresponding to the feed of the feed drum 1 after passing the blunt edge 30*b*.

In operation of this embodiment, when a pull is given at the free end of the adhesive tape 43 unwound, the adhesive tape 43 is pulled out from the tape drum 34 and causes the feed drum 1 to rotate by adhering of the former to the upper surface of the latter.

Figure 1:
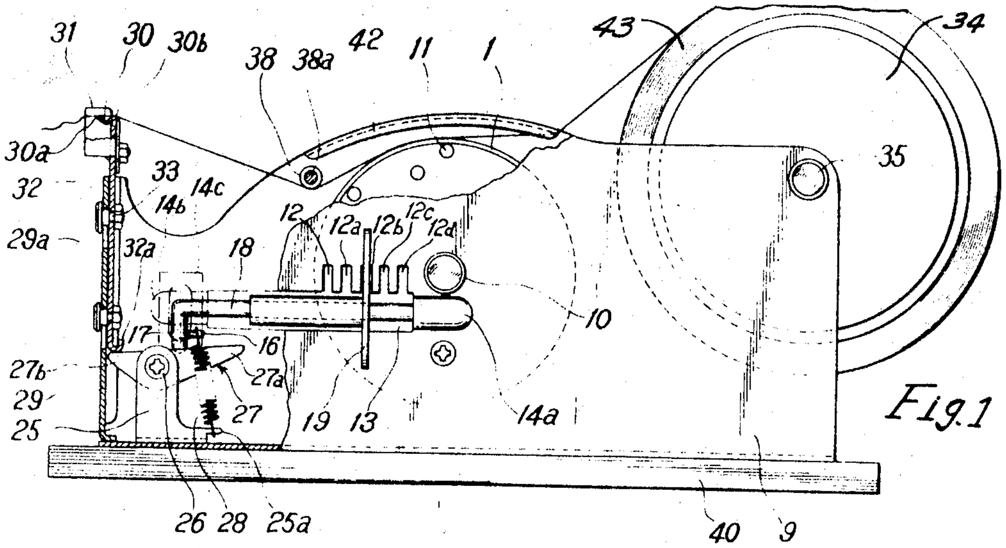
FIG. 1 is a left side elevational view, partly in section and partly broken away, of a tape cutter.
Figure 2:
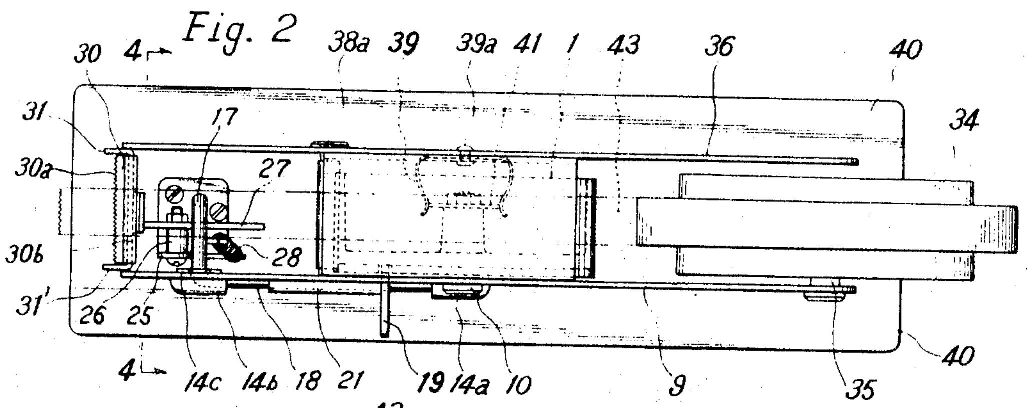
FIG. 2 is a plan view of the same.
Figure 3:
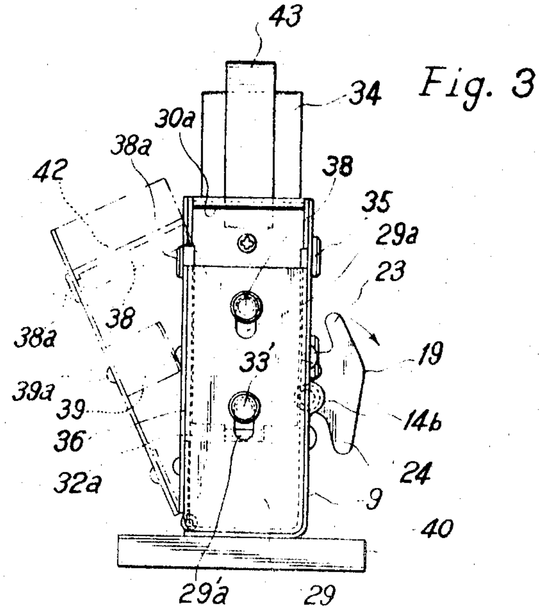
FIG. 3 is an end view from the front side of the same.
Figure 4:
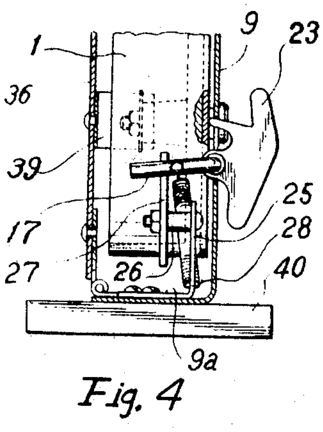
FIG. 4 is a cross-sectional view, partly omitted, taken on the line 4—4 of FIG. 2, showing the pawl pressing on the flat face of the regulating disc.
Figure 5:
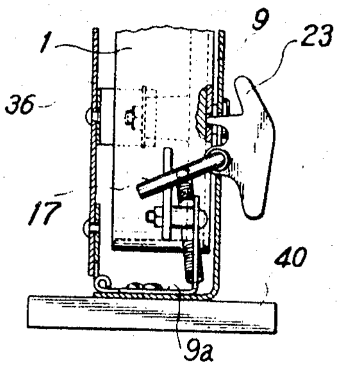
FIG. 5 is a view similar to FIG. 4, showing the pawl engaging with a regulating hole of the regulating disc.
Figure 6:
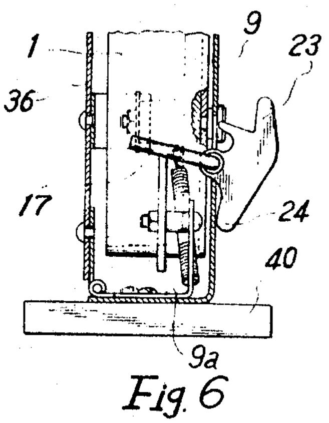
FIG. 6 is another view similar to FIG. 4, showing the sleeve in the state of sliding together with the collar on the action shaft.

Supposing the pawl 22 fits in the pectinate slot 12*b* and presses on the surface between the regulating holes 11*b*, 11*b* as shown in FIG. 4, where the pins 7 and 7' of the regulating disc 5 are at the fore ends of the slots 3 and 3' of the feed drum 1 respectively in the direction of rotation, as shown by a solid line in FIG. 8, the regulating disc 5 will rotate accompanying with the feed drum 1 by action of the coiled springs 8 and 8' connecting the studs 4 and 4' with the pins 7 and 7' respectively.

Thus, when a regulating hole 11*b* in a position following next to the pawl 22 in the rotational direction rotates to the position of the pawl 22, the pawl 22 engages with the hole 11*b* to prevent the regulating disc 5 from rotating.

However the feed drum 1 continues to rotate against the forces of the coiled springs 8 and 8' till the hind ends of the slots 3 and 3' come in contact with the pins 7 and 7' respectively, because the slots 3 and 3' have each play behind the pins 7 and 7' and stops at last.

Then the free end of the tape 43 is lowered and the adhesive face of the tape 43 is brought in contact with the blunt edge 30*b* and the serrated cutting edge 30*a* to cut the adhesive tape 43 by pulling it strongly downward.

Consequently, the sliding plate 32 falls and depresses the front end 27*b* of the lever 27 to raise the rear end 27*a* thereof against the force of the coiled spring 28 so that the action shaft 18 may turn outward together with the collar 19 to disengage the pawl 22 from the regulating hole 11*b*, while the regulating disc 5 is rotated by the restoring forces of the coiled springs 8 and 8', owing to each play before the pins 7 and 7' of the slots 3 and 3', till the pins 7 and 7' are brought in contact with the fore ends of the slots 3 and 3' respectively where the position relative to the hole 11*b* of the pawl 22 returns to the usual position for convenience of pulling the adhesive tape 43.

For the purpose of changing the cut length of the adhesive tape 43, the collar 19 may be turned outward in a degree by hand to unfit the pawl 22 from the pectinate slot 12*b* and shifted to the position of any other pectinate slot, wherein the pawl 22 is to be fitted, corresponding to the required length of cutting by sliding the sleeve 22 on the action shaft 18, while the projection 24 is contacting with the outer surface of the left side plate 9 for guidance.

Furthermore, when the pawl 22 is fitted in the pectinate slot 12*d* at the right end, the feed drum 1 and the regulating disc 5 are rotated en bloc by pulling the adhesive tape 43, where the pawl 22 presses on the non-hole surface of the regulating disc 5 so that the tape may be cut in any desired length.

While this invention has been described with particular reference to the construction shown in the drawing, it is to be understood that such is not to be construed as imparting limitations upon the invention, which is best defined by the claims appended hereto.

I claim:

1. A tape cutter for cutting an adhesive tape in a definite length successively comprising, in combination, a tape drum whereon an adhesive tape to be pulled out is wound; a feed drum, which is rotated by adhering of said adhesive tape pulled to the upper surface thereof, having a web plate provided with one or more arc-shaped slots in a concentric circle and one or more studs projecting inward; a regulating disc, whose inner face is put upon the outer face of said feed drum and whereto one or more pins projected through said slots respectively and connected with said studs of said feed drum by a coiled spring respectively is fixed corresponding to said slots of said feed drum, having many regulating holes in several series in several concentric circles at equal intervals in every series; a comb-shaped aperture with several upward pectinate slots, one whereof is excepted, corresponding to said series of said regulating holes respectively provided on a left side plate; an action shaft, which is journaled turnably, facing to said aperture, in two bearings provided on the outer surface of said left side plate, having an arm urged by a coiled spring to turn said action shaft inward as usual; a sleeve, which is mounted on said action shaft so as to turn together with the latter and to slide on the same, having a collar provided with a pawl to be engaged with and disengaged from one of said regulating holes through one of said pectinate slots; and a sliding plate rigidly provided with a cutting edge preceded by a blunt edge on the upper end thereof and usually kept in the raised position by the front end of a rockable lever so that said pawl engaging with one of said regulating holes may disengage therefrom upon depression of said sliding plate for cutting.

2. A tape cutter for cutting an adhesive tape in a definite length successively comprising, in combination, a tape drum whereon an adhesive tape to be pulled out is wound; a feed drum, which is rotated by adhering of said adhesive tape pulled to the upper surface thereof, having a web plate provided with two arc-shaped slots apart from each other at the angle of 180 degree in a concentric circle and two studs projecting inward in the middle between said two slots respectively; a regulating disc, whose inner face is put upon the outer face of said feed drum and whereto two pins projected inwardly through said slots respectively and connected with said two studs of said feed drum by a coiled spring respectively is fixed apart from each other at the angle of 180 degree corresponding to said slots of said feed drum, having many regulating holes in several series in several concentric circles at equal intervals in every series; a comb-shaped aperture with several upward pectinate slots, one whereof is excepted, corresponding to said series of said regulating holes respectively provided on a left side plate; an action shaft, which is journaled turnably, facing to said aperture, in two bearings provided on the outer surface of said left side plate about both ends of said aperture, having an arm urged by a coiled spring to turn said action shaft inward as usual; a sleeve, which is mounted on said action shaft so as to turn together with the latter and to slide on the same, having a collar provided with a pawl to be engaged with and disengaged from one of said regulating holes through one of said pectinate slots; and a sliding plate rigidly provided with a cutting edge preceded by a blunt edge on the upper end thereof and usually kept in the raised position by the front end of a rockable lever so that said pawl engaging with one of said regulating holes may disengage therefrom upon depression of said sliding plate for cutting.

3. A tape cutter for cutting an adhesive tape in a definite length successively comprising, in combination, a tape drum, whereon an adhesive tape to be pulled out is wound, being rotatably mounted on a lateral horizontal shaft overhung from the inside of the upper rear portion of the left side plate which is fixed uprightly to a base plate at the horizontal lower portion and forms a frame together with a right side plate connected with said left side plate spaciously parallel to said right side plate by means of a hinge; a feed drum, which is rotated by adhering of said adhesive tape pulled to the upper surface thereof, having a bottom-like web plate provided with two arc-shaped slots apart from each other at the angle of 180 degree in a concentric circle and two studs projecting inward in the middle between said two slots respectively; a regulating disc, whose inner face is put upon the outer face of said feed drum and whereto two pins projected inwardly through said slots respectively and connected with said two studs of said feed drum by a coiled spring respectively is fixed apart from each other at the angle of 180 degree corresponding to said slots of said feed drum which is rotatably mounted together with said regulating disc on a lateral horizontal shaft overhung from the inside of said left side plate in the middle part of said frame, having many regulating holes in several series in several concentric circles at equal intervals in every series; a comb-shaped aperture with several upward pectinate slots, one whereof is excepted, corresponding to said series of said regulating holes respectively provided on said left side plate; an action shaft, which is journaled turnably, facing to said aperture, in two bearings provided on the outer surface of said left side plate about both ends of said aperture, having an arm perpendicular thereto urged by a coiled spring to turn said action shaft inward as usual; a sleeve, which is provided with one or two opposing axial slits to receive a pin secured to said action shaft and is mounted on said action shaft so as to turn together with the latter and to slide on the same, having a collar provided with a pawl to be engaged with and disengaged from one of said regulating holes through one of said pectinate slots, a projection for limiting the depth of engagement of said pawl with said regulating holes and another projection for contacting with the outer surface of said left side plate; a sliding plate rigidly provided with a cutter blade of V-shaped cross section, having a serrated cutting edge preceded by a blunt edge, on the upper end thereof and usually kept in the raised position by the front end of a rockable lever so that said pawl engaging with one of said regulating holes may disengage therefrom upon depression of said sliding plate for cutting.

References Cited

UNITED STATES PATENTS 2,407,300 9/1946 Smith ---------------- 225—11

ANDREW R. JUHASZ, Primary Examiner

L. GILDEN, Assistant Examiner

U.S. Cl. X.R.

225—12